(12) United States Patent
Buehrle, II

(10) Patent No.: US 6,866,057 B1
(45) Date of Patent: Mar. 15, 2005

(54) THERMAL-PRESSURE RELIEF DEVICE

(76) Inventor: Harry W. Buehrle, II, 14 Alegria, Irvine, CA (US) 92620

(*) Notice: Subject to any disclaimer, the term of this patent is extended or adjusted under 35 U.S.C. 154(b) by 226 days.

(21) Appl. No.: 10/113,483

(22) Filed: Apr. 2, 2002

(51) Int. Cl.[7] ............................................. F16K 17/14
(52) U.S. Cl. .......................... 137/74; 137/79; 220/89.4
(58) Field of Search ............................. 137/68.12, 72, 137/73, 74, 79; 220/89.4

(56) References Cited

U.S. PATENT DOCUMENTS

| 900,763 | A | * | 10/1908 | McNutt | ........................ | 137/74 |
| 1,734,186 | A | * | 11/1929 | Lucien et al. | ............... | 220/89.4 |
| 1,973,182 | A | * | 9/1934 | Shaw | ........................ | 220/89.4 |
| 2,998,018 | A | * | 8/1961 | Beck et al. | ................... | 137/74 |
| 5,762,091 | A | * | 6/1998 | Sarne et al. | ................... | 137/74 |

FOREIGN PATENT DOCUMENTS

GB 689809 A1 * 4/1953 .................. 137/74

\* cited by examiner

*Primary Examiner*—John Rivell
(74) *Attorney, Agent, or Firm*—Gordon K. Anderson

(57) ABSTRACT

A thermal-pressure relief device, which has an adapter (20) threaded into the wall of a pressure vessel. The adapter contains an orifice (22) therethrough in line with a recessed cavity (32) which includes a raised stem (34). A blow out member (30) rests on the stem and overlaps the orifice to obstruct communication with the fluid inside the vessel. The blow out member is attached within the cavity by brazing with a filler metal in the form of a temperature responsive amalgam (38), preferably a eutectic alloy. When ambient temperatures are elevated above the melting point of the amalgam the blow out member is released freeing the orifice relieving the pressure within the vessel preventing a sudden structural failure. Optionally a protective cover in the form of a cap (42) with an impact surface (40) contains the blow out member when it separates from the adapter and a number of vents (48) diffuse the fluid from the pressure vessel in a safe direction. Another option for the protective cover is a tube (54) attached to the adapter with fastening means such that when the blow out member is released the conduit provides a safe structurally sound flow path permitting the pressurized fluid to be directed into a safe zone away from the thermal-pressure relief device.

11 Claims, 2 Drawing Sheets

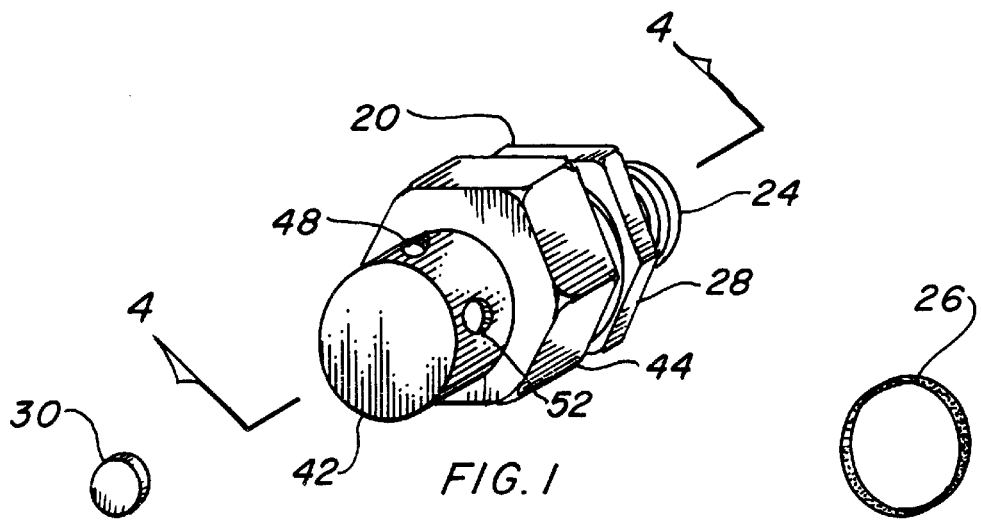
FIG. 1
FIG. 2
FIG. 3
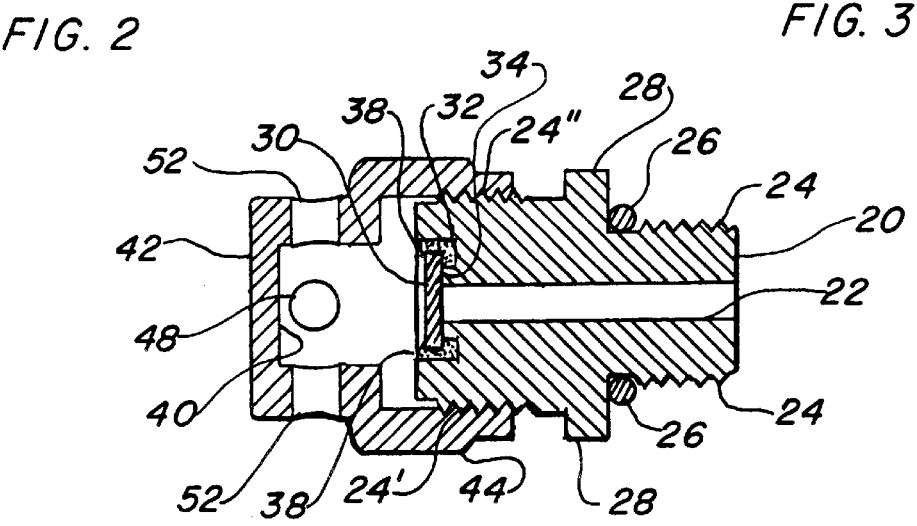
FIG. 4
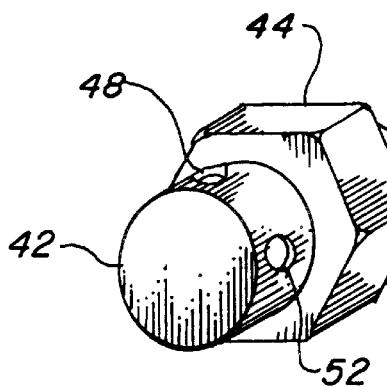
FIG. 5
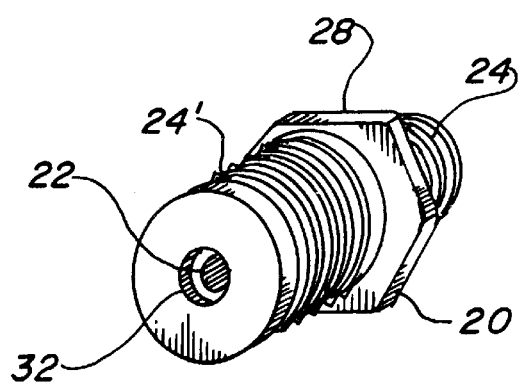
FIG. 6

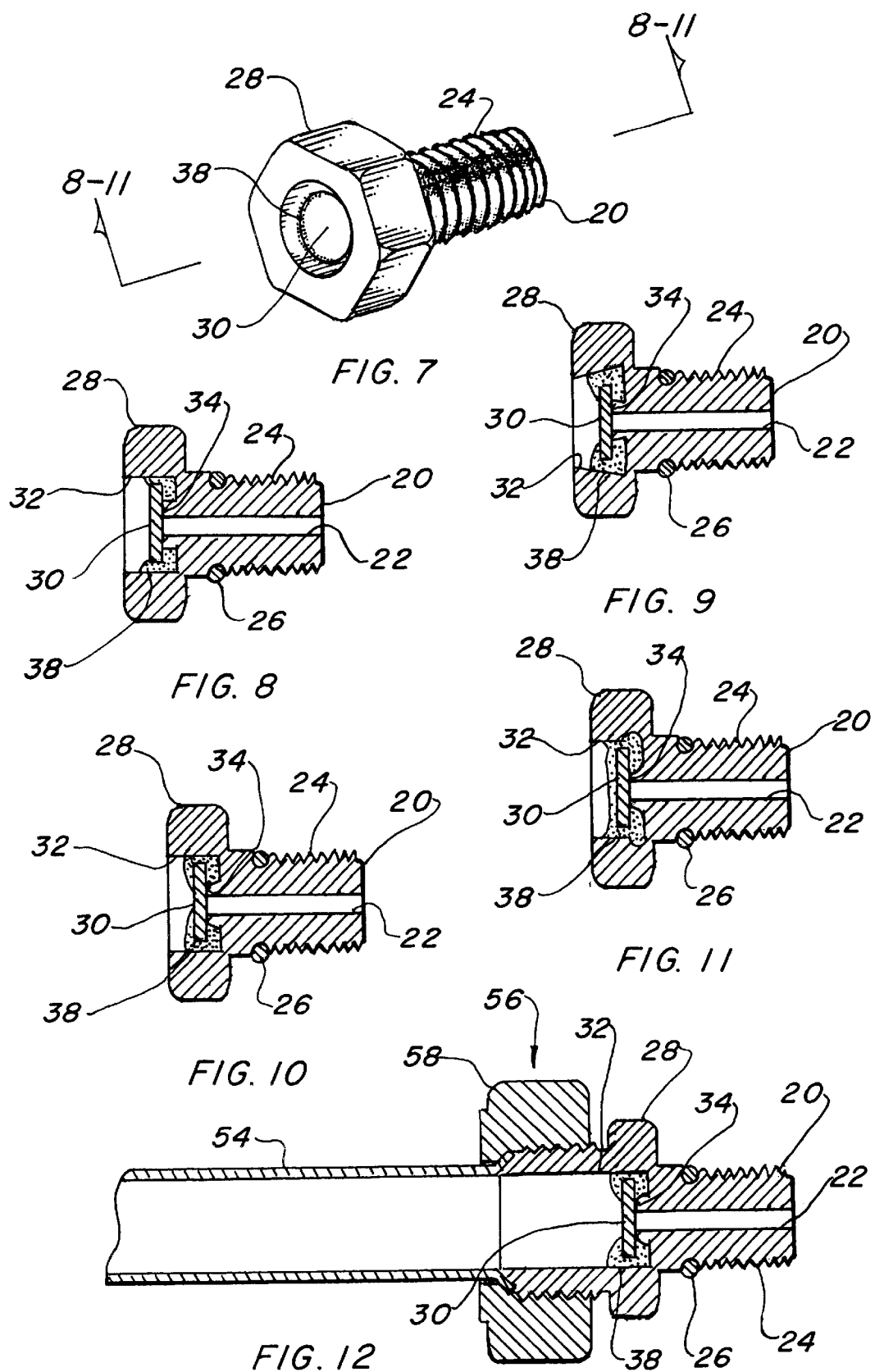

THERMAL-PRESSURE RELIEF DEVICE

TECHNICAL FIELD

The present invention relates to pressure relief devices in general. More specifically, to an improved device that will relieve pressure within a pressure vessel before high temperature has raised the pressure of the fluid within the vessel to a level which could cause a structural failure, or in a composite vessel which could result in loss of structural integrity.

BACKGROUND ART

Previously, many types of pressure relief devices have been used in endeavoring to provide an effective means for releasing pressure within a vessel. Any pressure vessel that is made to contain a compressed fluid, be it liquid or vapor, has the dangerous potential to explode when the internal pressure increases above the burst strength of the vessel material.

The Improvement protects the public from a dangerous situation that could actually kill or maim humans, government agencies have placed stringent requirements on all pressure vessels to include safety devices that relieve the pressure prior to reaching a critical point. Government agencies, as well as independent professional societies, trade associations and manufacturers groups issue codes to establish procedures and standards that are accepted by the government and the industry at large. 'With regard to pressure vessels, current methods incorporate pressure relief safety devices. Prior art may be in the form of relief valves that are usually spring loaded, membrane discs that open at a predetermined pressure range, or fusible plugs that are designed to melt at a given temperature for low pressure (500 psi/3,448 Kpa) relief These devices may be used separately or in concert. The relief port is sized to displace a given volume of fluid for a particular capacity vessel. The dimension of the relief port may also be controlled and precisely specified by government agencies such as Department of Transportation (DOT), as well as other civilian standards.

Prior art did not disclose any patents that possess the entire novelty of the instant invention, however my U.S. Pat. No. 5,762,091 issued on Jun. 9, 1998 is the basis upon which the instant improvements are made. Many of the same elements are used however the novelty of the improvement is that the circular recessed cavity that receives the blow out member is indented peripherally on the underside to allow the temperature responsive amalgam to be disposed on the underside of the blow out member.

DISCLOSURE OF THE INVENTION

Technology has advanced the field of pressure vessel fabrication from the traditional metallic construction, using a tube constructed by welding domed heads on each end, to lightweight vessels using composite materials. Minimal weight vessels are commonly constructed using a metal liner of ferrous or aluminum material wound on the outside with a fibrous filament impregnated or coated with a thermosetting resin and bonded together with heat and pressure. For example KEVLAR filament wound composite pressure vessels are used in aircraft where weight is of prime importance and pressures are elevated.

Similar lightweight vessels could replace heavy steel vessels used in alternate fuel vehicles, once the issue of thermal pressure relief has been resolved in the best interest of public safety.

Mechanical spring loaded membrane pressure relief valves may still be employed with higher pressure composite bottles, however their use does not fulfill the entire safety requirement of a pressure vessel subjected to external heat, such as a fire. Vessel safety assurance is not achieved with only a pressure relief valve, because the outside wound laminate acts as an insulator. This prevents the interior fluid from elevating in temperature and pressure sufficient to actuate the pressure relief valve before the vessel may be burned through, resulting in a sudden structural failure.

It is therefore a primary object of the invention to fulfill this recently created need for providing a thermal-pressure relief device that has high pressure capabilities for use with lightweight composite vessels, as well as other elevated pressure applications. It may be noted that at the present time, utilization of composite vessels is unlimited. One embodiment of the instant invention has been tested and qualified for a maximum working pressure of 3,500 psi (24,133 Kpa). Higher pressure applications are readily achievable which will satisfy ever emerging industry safety requirements.

Another object of the invention is that the material used to melt at relatively low temperature was prone to "Creep" failure of the eutectic after long term exposure to high stress.

This pressure limitation is due to a structural failure mode identified as Creep. A definition of "Creep" is, "a de-stressing movement causing a slow change of dimensional proportions". The common alloys utilized for thermal pressure relief are selected specifically for their low melting temperatures. These materials are comprised primarily of bismuth alloy, with other metals, including lead, tin, cadmium, and indium, none of which are known for their structural integrity under long term stress and loads. That is, all will fail due to creep, given sufficient time and stress.

While below 500 psi (3,448 Kpa) the problem is minimal, but at higher pressures and long term exposure, the thermal melt material degrades, therefore creep failure develops. To insure continued safety, existing relief devices are required to be replaced periodically. The need for continual replacement of existing pressure relief devices adversely affects "Life Cycle" cost and entails additional record keeping to insure proper "Change Outs" have occurred.

The present invention overcomes this problem by increasing the bonding area of the amalgam on the blow out member specifically on the underside or bottom of the member while reducing the pressure area of the contained fluid on the member relative to the relief orifice. The fluid within the pressure vessel has basically no direct contact with the low melting alloy. It should be noted, that traces of the amalgam may be inadvertently exposed at the interface of the orifice and the blow out member during the brazing process, however this minuscule amount is insignificant relative to any change, as a whole, in the de-stressing movement of the balance of the amalgam, as such it has been found, that this capillary overrun has no overall detrimental effect on its integrity. This unique embodiment permits the use of time tested commercially available low melting alloys while slowing and reducing the "Creep" failure mode.

Still another object of the invention is directed to existing problems created by incompatible materials. Existing designs allow the low melting alloys or amalgam to be in surface contact with the fluid within the vessel where chemical and electro-mechanical reactions may occur. The novel approach of using a separate blow out member of the same metal as the vessel liner, or a compatible metal with the compressed fluid, minimizes compatibly problems and retains the use of well know and reliable low melting alloys.

As discussed earlier the improvement in the invention over my previously issued U.S. Pat. No. 5,762,091 permits the application of the invention in cases where higher eutectic stresses are induced by higher temperatures, pressures or a combination of both. The improvement permits the amalgam to flow under the blow out member which maximizes the holding area and reduces the area of pressure acted upon by the contained fluid.

Further, later developments in lightweight pressure vessel design have allowed higher storage density. Metal hydrides, much like metal sponges, have been perfected to permit storage of hydrogen and other gasses at pressures up to 1,000 psi (6,896 Kpa), which now permits the instant improvement to be easily applied to this new application.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment,

FIG. 2 is an isometric view of the blow out member completely removed from the invention for clarity.

FIG. 3 is an isometric view of the compression seal in the form of an "O" ring completely removed from the invention for clarity.

FIG. 4 is cross sectional view of the invention taken along lines 4—4 of FIG. 1.

FIG. 5 is an isometric view of the protective cover completely removed from the invention for clarity.

FIG. 6 is an isometric view of the adapter completely removed from the invention for clarity.

FIG. 7 is a partial isometric view of the another embodiment of the invention without a protective cover.

FIG. 8 is a cross sectional view taken along lines 8—8 of FIG. 7 illustrating the trepan formed stem with right angle corners or sides.

FIG. 9 is a cross sectional view taken along lines 9—9 of FIG. 7 illustrating the stem with dovetailed corners and the circular recessed cavity also formed with dovetailed corners or sides.

FIG. 10 is a cross sectional view taken along lines 10—10 of FIG. 7 illustrating the trepan formed stem with angularly sloped corners or sides.

FIG. 11 is a cross sectional view taken along lines 11—11 of FIG. 7 illustrating the trepan formed cavity with round corners or sides and concave corners or sides on the raised stem.

FIG. 12 is a cross sectional view taken along lines 12—12 of FIG. 7 illustrating the trepan formed stem with convex corners or sides and a metallic tube connected to the adapter as the protective cover.

BEST MODE FOR CARRYING OUT THE INVENTION

The best mode for carrying out the invention is presented in terms of a preferred embodiment. The preferred embodiment is shown in FIGS. 1 thorough 12 and is comprised of an adapter 20 that contains an orifice 22 in the form of a hole or bore that penetrates the entire longitudinal axis. This orifice 22 is preferably positioned on the centerline, however any location is acceptable provided it continues though allowing communication with the fluid inside the pressure vessel. The adapter 20 has a first end and a second end with the first end configured in such a manner as to be connected through a pressure vessel wall in intimate contact with the working fluid stored inside. The orifice 22 provides a conduit for allowing fluid to escape in the event of excessive pressure within caused by external heat. The second end of the adapter 20 includes a circular recess cavity 32 larger in diameter than the orifice 22. The diameter and tolerance of the orifice may be selected by code requirements such as dictated by the United States Department of Transportation, specifically DOT 3AX, 3AAX, and 3T, Code of Federal Regulations CFR 173.34(d) as well as industry standards including the Compressed Gas Association Inc. CGA PRD-1 (CG-10) Standard 1998. These codes include requiring a definite flowrate for the fluid volume within a given pressure vessel that the relief device protects. The orifice size is selected by calculations using the volume of the vessel and the particular fluid, further the flowrate of exit gas (or liquid) is rated in cubic feet per minute (CFM).

FIG. 4 illustrates the adapter 20 in cross-section and FIG. 6 depicts it removed from the invention for clarity in one embodiment and FIGS. 7–11 depict another embodiment which operates in the same manner but omits the cover. Connections to the pressure vessel may be made by various methods known in the art. As an example, FIG. 4 depicts the well known high pressure seal that uses a set of straight threads 24 for mechanical engagement and a resilient seal, in the form of an "O" ring 26 for a liquid/vapor-tight closure. While this connecting and sealing approach is illustrated and described, any type of connection and sealing means may be used with equal ease and dispatch. These approaches include tapered threads, dry-seal threads, metallic crush and many other connections known to those skilled in the art. Actually a so called drop-in fuse assembly such as a snap-ring, cross pin or the like, may be utilized instead of the threads normally used for the connection.

In order to rotate the adapter 20 mechanically with the threaded embodiments, wrench gripping means may be provided. The preferred method is illustrated in FIGS. 1, 4, 7–12 which is to incorporate a hexagonal flange 28 integral with the body of the adapter 20. While a hexagonal shape is shown and in common use, any form is also acceptable, such as square, rectangular, round with opposed flats etc. Wrench gripping means may also include screwdriver slots, holes for wrenching bars or any other method of rotating a device to produce a suitable connection.

A non-permeable blow out member 30 engages a recessed cavity 32 within the adapter 20 overlaying or covering the orifice 22, obstructing the flow of fluid from within the vessel. This cavity 32 provides a convenient seat for centering the blow out member 30 in the middle of the orifice 22 and permits an ideal socket for attachment. The recessed cavity 32 is a counter bore, shaped by a trepan, which also serves to decrease the area of contact between the member 30 and the adapter 20. It has been found that a surface area in excess of 150 percent larger than the area of the orifice 22, allows the ideal peripheral space relationship. The cavity 32 is therefore larger on the outside diameter than the member and a raised stem 34 is formed by the trepan. The stem 34 may be at right angles to the side walls and bottom as shown in FIGS. 4 and 8 or may have the peripheral edges configured as a dovetail, shown in FIG. 9, an inward slope, illustrated in FIG. 10, a concave bevel depicted in FIG. 11 or a convex bevel shown in FIG. 12. It should also be noted that the circular recessed cavity 32 may also be formed with edges or sides configured in like manner, only opposite, such as a dovetail illustrated in FIG. 9, and again similar, only in reverse, an inward slope, like that illustrated in FIG. 10, a concave bevel depicted similarly in FIG. 11, almost the same as the round indented corner illustrated, or a convex bevel resembling the reverse of FIG. 12.

The member 30, in its preferred embodiment, is illustrated in FIGS. 2, 4 also 7–12 and is configured to be positioned within the recessed cavity 32 in the adapter 20 which is bored axially to the orifice 22. The member 30 preferably consists of a plate, at least flat on one side, made of metal, possibly the same material as the adapter 20, such as stainless steel or brass. The blow out member 30 may be formed with circular edges and a flat or radial bottom. While round and flat is the simplest shape for the member 30, as illustrated in the drawings, other shapes and forms may be used such as square, triangular, oval, parabolic or any other irregular shape. Other metals, or even non-metals may be used in the blow out members construction, for compatibility with the vessel liner and/or fluid stored within the vessel. An important point of novelty if the invention is that the member may be easily formed of a compatible material that is in almost exclusive communication with the internal fluid of the vessel which differs greatly from the prior art in the same field of endeavor.

A temperature responsive amalgam 38 is fixed between the adapter 20 and the member 30 and acts as the attachment means connecting the two together and effectively obstructing the orifice 22 in a leakproof manner. This amalgam 38 is selected for its predictable and relatively low temperature melting characteristics which is a eutectic alloy, sometimes called a low melt alloy and is the preferred material. Other materials having broader temperature melt ranges (non-eutectic) may also be used as the amalgam. The chief component in this amalgam alloy is bismuth, a heavy coarse crystalline metal combined with other metals such as lead, tin cadmium and indium. The melting temperature of this alloy may vary around 100 degrees F. (28 degrees C.) according to the formulation. Selection of the specific melting temperature is dependent upon the unique requirement of the application and upon the fluid being housed within the vessel also the vessel design characteristics. A specific manufacturer of this product is The Cerro Metal Products Division of The Cerro Corporation of Pennsylvania, marketed under the registered trademark CERRO ALLOYS.

The specific amalgam 38 is applied to the invention as a welding process in the form of brazing, rather than simply filling the orifice 22 with the base material as employed in the fusible plugs of prior art. Major difficulties arise, as previously discussed, by exposing the amalgam 38 to the fluid within the vessel. The member 30, therefore, is simply brazed into the adapter 20 using the amalgam 38 in the form of a eutectic alloy as the filler metal. The close fitting joint between the member 30 and adapter 20 is filled by capillary action of the liquidous alloy when the assembly is heated to a temperature above the melting point of the alloy but below that of the metal being joined. This coalescence produces a solid brazed joint that eliminates the problems pertaining to exposure the amalgam 38 to the stored fluid, while still allowing the physical properties of the eutectic alloy to melt at the appropriate temperature and produce the desired thermal-pressure relief While the preferred embodiment, depicted in FIG. 1 utilizes a recessed cavity 32 in the form a countersunk hole in order to preserve the integrity of the joint while allowing contact of the amalgam 38 to the fluid, external pressure may be applied to the member 30 compressing it to the raised stem 34 of the adapter 20 during the brazing process precluding any flash-over or seepage into exposed surfaces. While the preferred amalgam 38 is a eutectic alloy, other substances function equally well. Silver alloy having a melting point from 350 degrees F. (176 degrees C.) to 1200 degrees F. (648.9 degrees C.), thermoset plastics, thermoplastics or anaerobic adhesives, in all their varieties and formulations may be utilized, dependent of course, upon the desired melting point.

It will be noted that the welding or brazing process may leave a small fillet around the edge of the member 30 as shown in FIGS. 4 and 8 or may extend on the surface equal to the width of the amalgam 38 under the member, as shown in FIG. 9. Further it is also acceptable to have the amalgam 38 extend until it almost touches as shown in FIG. 10 or covers the member 30 entirely as illustrated in FIG. 11. In any event the amalgam 38 must be, at a minimum, at least on the underside below the member 30, to make a secure and reproducible joint.

In normal conditions, the entire device is subjected to the usual prevailing ambient temperatures, however, if adverse conditions arise such as when the pressure vessel is exposed to a fire, the external ambient temperature will rise above the melting point of the amalgam 38, thereby freeing the member 30. Pressure within the vessel will then blow out the member 30 clearing the orifice passageway safely relieving the fluid pressure within, before an explosion can occur. It has been found by computer modeling, and by physical tests, that the recessed cavity 32 should be at least 115 percent larger in area than the blow out member 30 in order for the amalgam 38 to produce optimum cohesion and minimize time dependent inelastic stress relaxation.

In one embodiment a protective cover, in the form of a threaded cap 42, engages the adapter 20, as shown in FIGS. 1, 4 and 5, and includes a continuous structurally sound impact surface 40 in spaced alignment with the blow out member 30. The member 30 impinges on this impact surface 40 when it is blown out and separates from the adapter 20. The preferred protective cover consists of a threaded cap 42 made of metal, such as brass, steel, iron, stainless steel or aluminum etc. and contains a set of threads 24' that mate with opposed threads 24" in the adapter 20. The outside surface of the cap 42 includes an integral flange with flats 44 having a wrench engagement surface. A hexagonal shape of this flange 44 is preferred, however, any number of flats any other type of wrench compatible exterior is acceptable.

While threads 24' and 24" are illustrated to attach the cap 42 to the adapter 20 the male and female relationship may be reversed or other means may be used to fasten the cap to the adapter, such as structural adhesive, welding, pinning, riveting, or basic threaded fasteners in shear.

Another embodiment of the protective cover is shown in FIG. 12 which is a conduit attached to the adapter with fastening means, such that when the blow out member is released, the conduit provides a safe structurally sound flow path permitting the pressurized fluid to be directed into a safe zone away from the thermal-pressure relief device. The conduit comprises a metallic tube 54 and fastening means in the form of a connector 56 which may consist of a single flare nut 58, as illustrated in FIG. 12. Further options for the fastening means include a flare nut with double flaring, a compression nut with a metallic crush washer, an o-ring, or a compression nut with a compression sleeve etc. While the single flare nut 58 is shown the other optional connectors are not illustrated as they are well known in the art an in common usage in the industry.

While the invention has been described in complete detail and pictorially shown in the accompanying drawings, it is not to be limited to such details, since many changes and modifications may be made to the invention without departing from the spirit and scope thereof Hence, it is described to cover any and all modifications and forms which may come within the language and scope of the appended claims.

adapter
orifice
threads
o ring
hex flange
blow out member
recessed cavity
raised stem
amalgam
impact surface
threaded cap
flange w/flats (on 42)
vents
holes
tube
connector
flare nut

What is claimed is:

1. A thermal-pressure relief device for pressure vessels that contains a compressible fluid comprising:
    an adapter having a first end and a second end with an orifice therethrough, the first end disposed within a pressure vessel wall in intimate contact with working fluid stored therein, the second end having a trepan shaped circular recessed cavity, larger in diameter than the orifice with a centrally positioned raised stem integrally formed therein,
    a blow out member, having a top, bottom and side edge, smaller in diameter than the circular recessed cavity and intimately engaging the raised stem of the cavity, overlaying said orifice so as to create an obstruction, ultimately preventing fluid flow through the orifice, and
    a temperature responsive amalgam disposed within the adapter circular recessed cavity contiguous with the blow out member bottom, side edge and top periphery, joining them together in a cohesive manner, providing a leakproof closure, disjoining at a predetermined external ambient temperature, relieving fluid pressure within the vessel as a safety measure to prevent an explosion due to excessive structural stress.

2. The thermal-pressure relief device as recited in claim 1 further comprising a protective cover structurally engaging the adapter, having a continuous structurally sound impact surface in spaced alignment with the blow out member also a plurality of vents for diffusing fluid from the pressure vessel in a safe manner.

3. The thermal-pressure relief device as recited in claim 2 wherein said protective cover vents are angularly opposed to the impact surface diffusing fluid axially from the relief device.

4. The thermal-pressure relief device as recited in claim 1 further comprising a protective cover structurally engaging the adapter defined as a conduit attached to the adapter with fastening means such that when the blow out member is set loose, the conduit provides a safe structurally sound flow path permitting the contained fluid to be directed into a safe zone away from the thermal-pressure relief device.

5. The thermal-pressure relief device as recited in claim 4 wherein said conduit further comprises a metallic tube and the fastening means further comprises a connector selected from the group consisting of a single flare nut, flare nut with double flaring, compression nut with a metallic crush washer, an o-ring, and a compression nut with a compression sleeve.

6. The thermal-pressure relief device as recited in claim 1 wherein said circular recessed cavity area is in excess of 150 percent larger in area than the orifice diameter.

7. The thermal-pressure relief device as recited in claim 6 wherein said circular recessed cavity area relative to the orifice area overcomes time dependent inelastic stress relaxation on the amalgam at pressures above 500 pounds per square inch (3447.5 Kpa) and above 100 degrees F. (37.8 degrees C.) for a duration of 500 hours as set by industry standards.

8. The thermal-pressure relief device as recited in claim 1 wherein said blow out member is formed with circular edges and a flat top and bottom.

9. The thermal-pressure relief device as recited in claim 1 wherein said circular recessed cavity is configured with edges selected from the group consisting of a right angle, a dovetail, an inward slope, a concave bevel, a round indented edge and a convex bevel.

10. The thermal-pressure relief device as recited in claim 1 wherein said raised stem is configured with peripheral edges selected from the group consisting of a right angle, a dovetail, an inward slope, a concave bevel and a convex bevel.

11. A thermal-pressure relief device for pressure vessels that contains a compressible fluid comprising:
    an adapter having an orifice therethrough, and a recessed cavity, with a raised stem integrally formed therein,
    a blow out member, engaging the raised stem of the cavity, preventing fluid flow through the orifice, and
    a temperature responsive amalgam disposed within the adapter recessed cavity contiguous with the blow out member, providing a leakproof closure, disjoining at a predetermined external ambient temperature, relieving fluid pressure within the vessel as a safety measure to prevent a sudden structural failure due to excessive structural stress.

* * * * *